(12) United States Patent
Bobst

(10) Patent No.: US 7,957,732 B2
(45) Date of Patent: Jun. 7, 2011

(54) DEVICE AND METHOD FOR QUALITY TESTING USING A BATTERY OPERATED MOBILE PHONE

(75) Inventor: Hanspeter Bobst, Oensingen (CH)

(73) Assignee: Swissqual License AG (CH)

( * ) Notice: Subject to any disclaimer, the term of this patent is extended or adjusted under 35 U.S.C. 154(b) by 773 days.

(21) Appl. No.: 11/916,534

(22) PCT Filed: Jun. 13, 2006

(86) PCT No.: PCT/CH2006/000317
§ 371 (c)(1),
(2), (4) Date: Feb. 25, 2008

(87) PCT Pub. No.: WO2007/000065
PCT Pub. Date: Jan. 4, 2007

(65) Prior Publication Data
US 2008/0200218 A1    Aug. 21, 2008

(30) Foreign Application Priority Data
Jun. 29, 2005   (EP) .................................... 05014048

(51) Int. Cl.
*H04W 24/00*   (2009.01)
(52) U.S. Cl. ..... 455/425; 455/423; 455/424; 455/67.11; 455/67.12; 455/67.13; 455/67.14; 455/67.15; 455/67.7; 455/557; 455/572; 324/756.01; 324/756.02; 324/756.05; 307/125; 307/126

(58) Field of Classification Search .......... 455/423–425, 455/67.11–67.15, 67.7, 557, 572; 324/756.01, 324/756.02, 756.05; 307/125, 126
See application file for complete search history.

(56) References Cited

U.S. PATENT DOCUMENTS

| | | | |
|---|---|---|---|
| 5,389,885 A | 2/1995 | Swart | 324/761 |
| 5,859,481 A * | 1/1999 | Banyas | 307/64 |
| 5,884,195 A * | 3/1999 | Gomez et al. | 455/572 |
| 7,020,443 B2 * | 3/2006 | Talvitie et al. | 455/67.14 |
| 2004/0205154 A1 * | 10/2004 | Dalton et al. | 709/217 |
| 2004/0207422 A1 * | 10/2004 | Lehtinen et al. | 324/758 |

FOREIGN PATENT DOCUMENTS

| | | |
|---|---|---|
| DE | 44 01 469 | 7/1994 |
| JP | 03 007435 | 3/1991 |

OTHER PUBLICATIONS

PCT International Search Report dated Jul. 26, 2006 issued in corresponding PCT International Appln. No. PCT/CH2006/000317 filed Jun. 13, 2006.

* cited by examiner

*Primary Examiner* — Tuan A Tran
(74) *Attorney, Agent, or Firm* — Ostrolenk Faber LLP

(57) ABSTRACT

In order to mount a mobile phone in a test device, the current between the battery unit and the phone unit is fed through a switch unit. The switch unit contains at least one switch for interrupting the current, e.g. for resetting the mobile phone after malfunction.

10 Claims, 6 Drawing Sheets

DEVICE AND METHOD FOR QUALITY TESTING USING A BATTERY OPERATED MOBILE PHONE

CROSS-REFERENCE TO RELATED APPLICATION

The present application is a 35 U.S.C. §§371 national phase conversion of PCT/CH2006/000317, filed Jun. 13, 2006, which claims priority of European Patent Application No. 05014048.2, filed Jun. 29, 2005, the disclosure of which has been incorporated herein by reference. The PCT International Application was published in the English language.

TECHNICAL FIELD

The invention relates to a device as well as to a method for quality testing using a battery operated mobile phone.

BACKGROUND ART

To characterize the quality and performance of a mobile phone network, a mobile phone is conventionally placed in a suitable test device and brought into different locations within the network. At each location, the quality of communication is tested and logged. Similar test devices can also be used to test the quality of a mobile phone.

While in the test device, the phone is typically powered by a "dummy battery", which replaces the normal battery unit of the phone and is connected to an external power source. The "dummy battery" simulates the behavior of the phone's normal battery unit. This allows to interrupt the power supply to the phone in order to reset it in case of malfunction. This scheme becomes, however, more and more difficult because modern battery units are complex and therefore difficult to simulate.

DISCLOSURE OF THE INVENTION

The problem to be solved by the present invention is to provide a method and device that allows to keep the phones powered while avoiding this issue at least partially.

This problem is solved by the method and device according to the independent claims.

Hence, the phone's battery unit is connected to the phone unit via a switch unit. The switch unit comprises one or more switches, which allow to interrupt the connection between the battery unit and the phone unit if required. Hence, when in operation, the phone unit can detect the presence of its regular battery unit and works correctly. For resetting the phone, the switch, can be interrupted.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

In a first section of the following description, the general design of one possible testing device is described. In a second section, the power supply for the phone is disclosed in detail.

General Design

Figure 1:
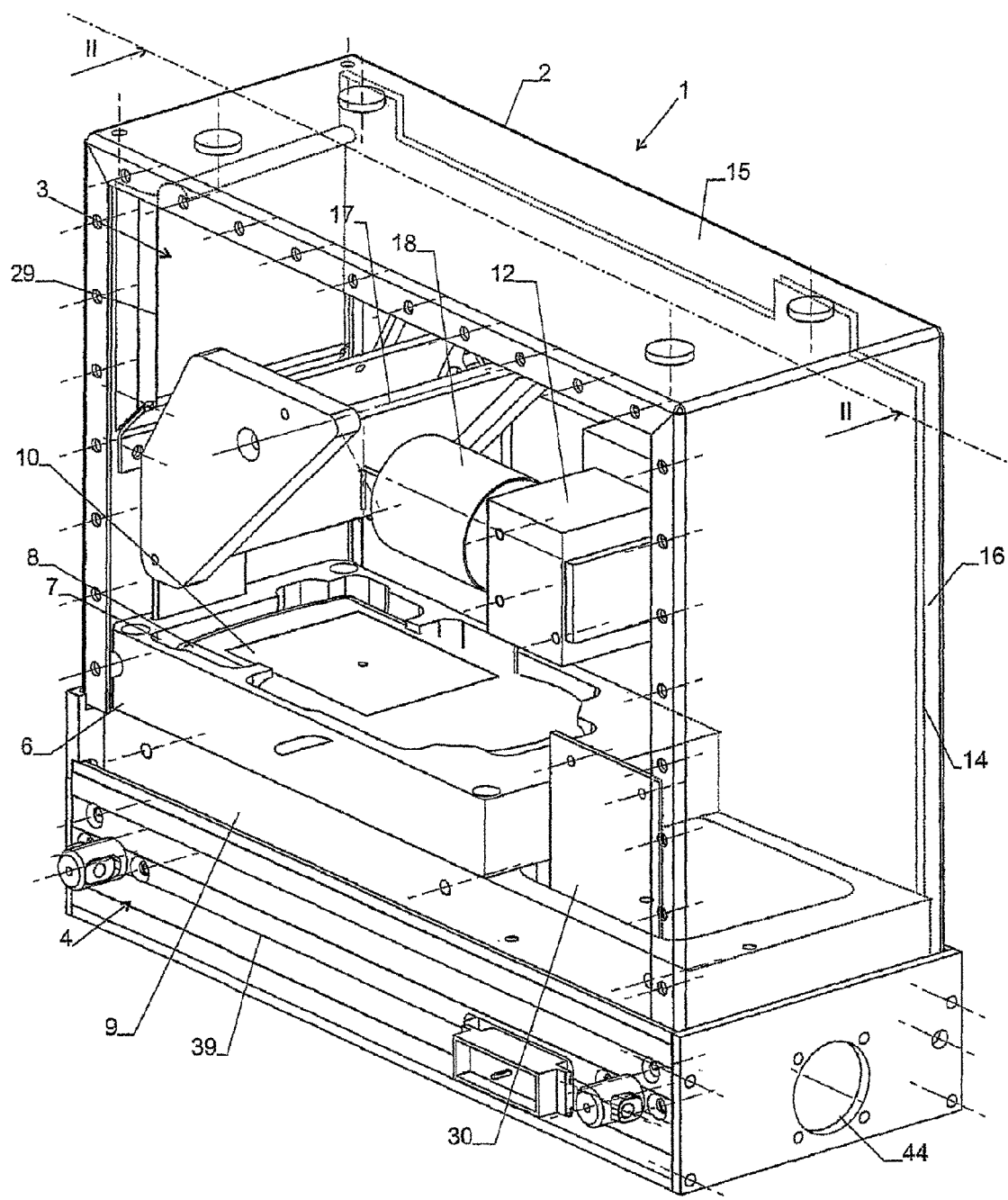
FIG. 1 is a three dimensional view of an embodiment of the device with one side wall removed.
Figure 2:
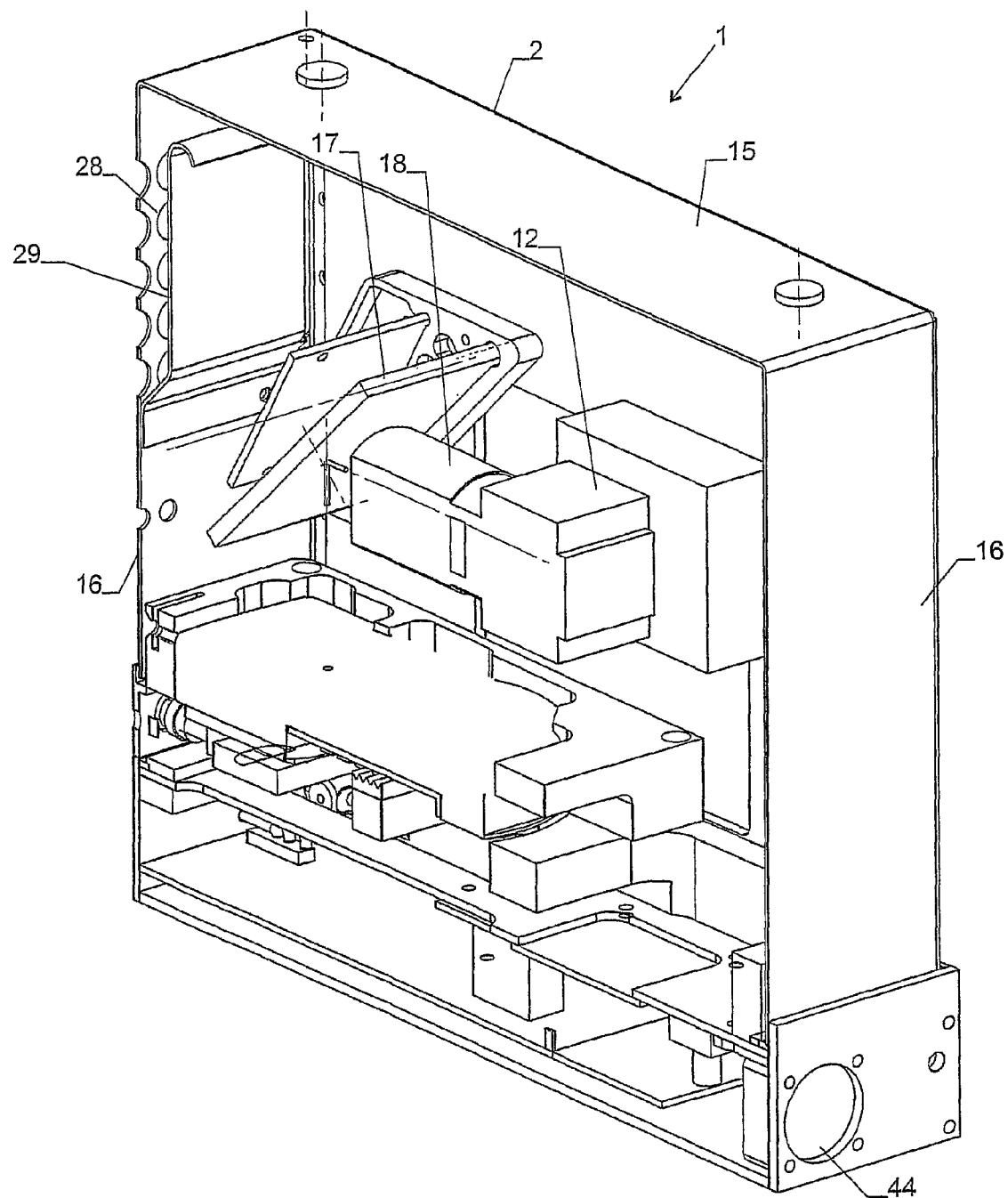
FIG. 2 is a three dimensional sectional view in a vertical plane along line II-II of FIG. 1.
Figure 3:
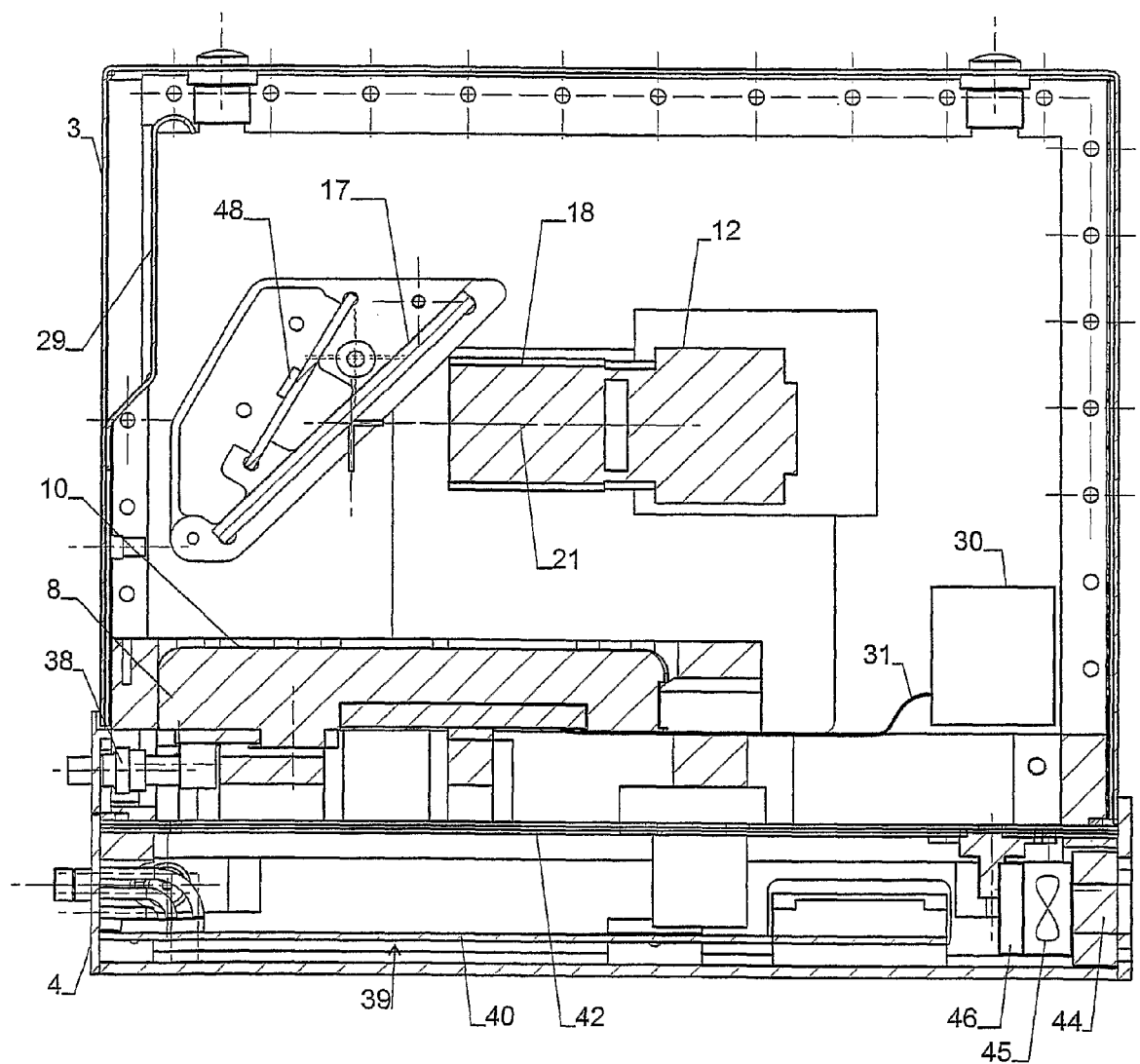
FIG. 3 is a two dimensional sectional view along line II-II of FIG. 1.

FIGS. 1-3 show a device 1 for testing mobile phones and their reception in a mobile phone network. The device comprises a housing 2 divided into an upper housing section 3 and a lower housing section 4.

A phone holder 6 is arranged in upper housing section 3. In the present embodiment, it is formed by a frame-like structure surrounding a central opening or recess 7 shaped to receive a phone 8 in a well defined position and orientation. Phone holder 6 is a modular part that can be replaced easily. Differently shaped phone holders 6 can be provided for different types and brands of phones. Phone holder 6 is mounted on a frame structure 9 in the bottom part of upper housing section 3.

The mobile phone 8 shown in FIG. 1 is a device with an integrated display 10. It is placed in phone holder 6 in such a way that display 10 is facing upwards.

To monitor the quality of an image or video on display 10, a camera 12 can be arranged in upper housing section 3. Camera 12 is mounted to a mount formed by two vertical plates 14 resting on frame structure 9, one of which is indicated in dashed lines in FIG. 1, with the other being parallel thereto arranged at the opposite side of the device. At their upper ends, the vertical plates 14 are connected to a top wall plate 15 of upper housing section 3, which in turn is connected to four vertical wall plates 16, thereby forming a rigid structure for keeping the relative position between camera 12 and display 10 fixed even when the device is exposed to movements, e.g. while it is being driven or walked through a mobile phone network.

Imaging optics comprising a mirror 17 and a camera objective 18 project the light from display 10 onto the photosensitive array of camera 12, which allows to view the image or video data displayed on display 10 by means of the camera.

As can best be seen in FIG. 3, mirror 17 is arranged under an angle of approximately 45°, such as between 30° and 60°, in respect to the surface of display 10. It reflects the light coming from display 10 into the direction of the axis 21 of camera 12. Camera axis 21 is substantially parallel to the surface of display 10 and to the longitudinal axis of mobile phone 8.

As mentioned above, mirror 17 folds tte projection path of the imaging optics, thereby allowing to create a more compact device that takes less space and is mechanically more stable.

Figure 4:
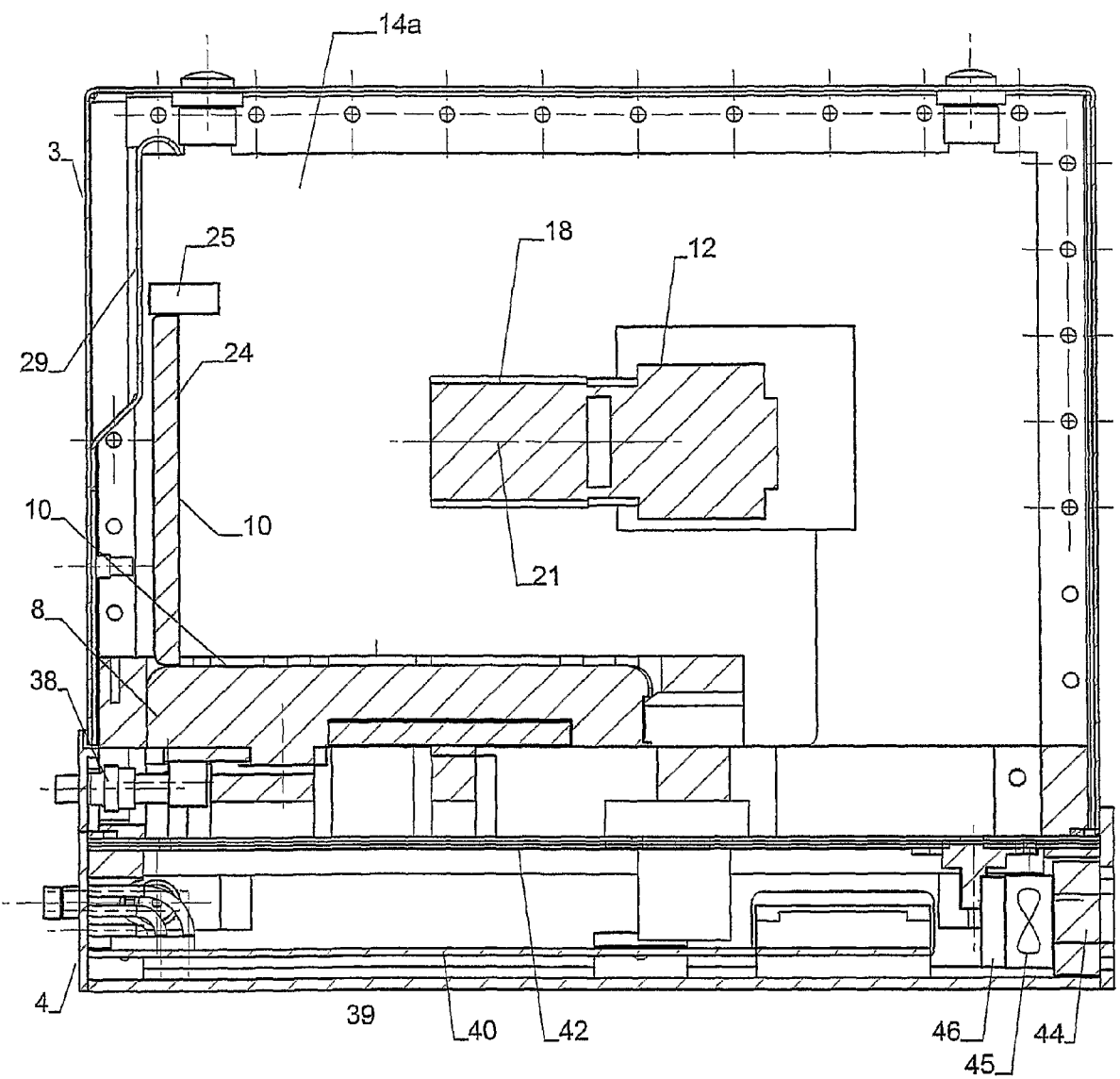
FIG. 4 is the device of FIG. 3 modified to receive a phone with hinged display.

A second advantage of using a design with folded projection path is the fact that, by removing mirror 17, it becomes possible to use the same basic design for testing a phone with hinged display, such as it is shown in FIG. 4. The device of FIG. 4 is being used for a phone the display 10 of which is in a separate display housing 24 pivotally attached to the body of phone 8. To allow camera 12 to view display 10 of the phone, display housing 24 is pivoted such that display 10 is substantially vertical and stands perpendicularly to camera axis 21. A retainer 25 e.g. mounted to vertical plate 14 is used to keep display housing 24 in its vertical position.

Turning now back to FIGS. 1-3, it can be seen that there is a number of objects arranged in upper housing section 3, all of which can potentially reflect the diffuse light coming from display 10. To avoid undesired noise from such reflected light in the signal of camera 12, all components within upper housing sections 3 with the exception of the imaging optics 17, 18 and the mobile phone 8 should have black, non-reflecting surfaces. This is in particular true for the walls 15, 16 and the vertical plates 14.

In addition, and as best can be seen in FIG. 2, upper housing section 3 has a number of ventilation openings 28 in one of the vertical walls 16. These ventilation openings carry off heat generated by the device 1 and the phone 8. To prevent light entering ventilation openings 28 from reaching camera 12, at least one light baffle plate 29 is arranged in front of the openings 28 for forming a labyrinth preventing light from entering upper housing section 3. Baffle plate 29 is non-transparent plastic or metal plate. To further improve the light retention properties of the labyrinth, several baffle plates can be arranged behind each other, forming a meandering path for passage of the ventilation air between them.

When using device 1, it may frequently be necessary to change some characteristics on the SIM card of phone 8, e.g. for switching between different network providers. To simplify this process, a SIM card holder 30 externally to phone 8 is arranged in upper housing section 3. A connector 31, as shown in FIG. 3, is provided to connect SIM card holder 30 to a dummy SIM card placed in the SIM card bay of phone 8, thereby connecting a SIM in SIM card holder 30 to phone 8. This makes it possible to replace the SIM card without removing phone 8 from phone holder 6.

Upper housing section 3, and in particular the walls 15, 16 as well as the vertical plates 14, can be made of a plastic or metal. If they are of a conductive material, they may hinder radiowave communication between phone 8 and a mobile phone network.

To ensure proper communication between phone 8 and the network, upper housing section 3 is therefore, in one embodiment, at least partially of plastics for allowing radiowave communication between phone 8 in holder 6 and the mobile phone network. In particular, the walls 15, 16 as well as the vertical plates 14 are, in that case, advantageously made from a sturdy plastic material.

Alternatively, and as shown in particular in FIG. 3, a lead-through 38 may be provided for connecting phone 8 in phone holder 6 to an external antenna.

The signals from camera 12 must be processed by suitable control and processing circuitry. This circuitry is preferably integrated, at least in part, in device 1.

In the embodiment of FIGS. 1-3, most parts of the control and processing circuitry 39 are located on a PCB in lower housing section 4. In an advantageous embodiment, the control and processing circuitry 39 forms an image processing computer for evaluating the quality of the image or video from camera 12 connected to it.

Control and processing circuitry 39 further comprises electronic components and software for controlling and monitoring the operation of phone 8. In particular, it is connected to a digital interface of the phone, which allows the circuitry to issue commands to the phone and to receive status information therefrom. It may also contain an interface to an audio output of phone 8.

To prevent RF noise generated by processing circuitry 39 from interfering with the operation of phone 8, an RF shielding 42 is arranged between the two housing sections 3, 4, separating phone holder 8 from processing circuitry 39. (In this context, "RF noise" designates any electromagnetic noise in a frequency range above 1 MHz and in particular in the frequency range of communication that mobile phone networks are using.)

RF shielding 42 can e.g. consist of a metallic net or punctured plate, which has openings for the passage of electric cables and ventilation air.

An air inlet opening 44 is arranged in lower housing section 4, connecting the same to the surroundings of device 1. A ventilator 45 and heater 46, as schematically indicated in FIG. 3, are arranged at air inlet opening 44 for drawing in air and, if necessary and as described below, for heating the same.

The air drawn in by ventilator 45 through heater 46, through lower housing section 4, where it carries off heat generated by control and processing circuitry 39, and then enters upper housing section 3, where it carries off heat generated by phone 8 and camera 21. It then passes the gap above light baffle plate 29 and exits through the outlet openings 28.

To control the operation of the heater 46, a temperature sensor 48 is arranged in upper housing section 3. The temperature from temperature sensor 48 is monitored by control and processing circuitry 39 and heater 46 is switched on if the temperature in upper housing section 3 is below a preferred operating temperature of phone 8, e.g. at 20° C. The advantage of this is two-fold: One the one hand, phone 8 and in particular its display 10 may fail if temperatures are too low. On the other hand, heating the incoming air reduces its relative humidity, thereby reducing the risk of water condensation on display 10 of phone 8, on imaging optics 17, 18, and/or on camera 12.

The algorithms to be used in control and processing circuitry 39 for analyzing the quality of the incoming image or video signal depend on if a "full reference", "reduced reference" or "no reference" analysis is to be carried out, i.e. if the original image or video (before it was transmitted over the network) is known fully, in part or not at all. Various such algorithms are known to the person skilled in the art and e.g. described in Z. Wang, A. C. Bovik, and B. L. Evans, "Blind measurement of blocking artifacts in images," in Proc. IEEE Int. Conf. Image Proc., vol. 3, September 2000, pp. 981-984, or in H. R. Sheikh, Z. Wang, L. K. Cormack, and A. C. Bovik, "Blind Quality Assessment for JPEG2000 Compressed Images", Thirty-Sixth Annual Asilomar Conference on Signals, Systems, and Computers, Pacific Grove, Calif., Nov. 3-6, 2002.

Figure 5:
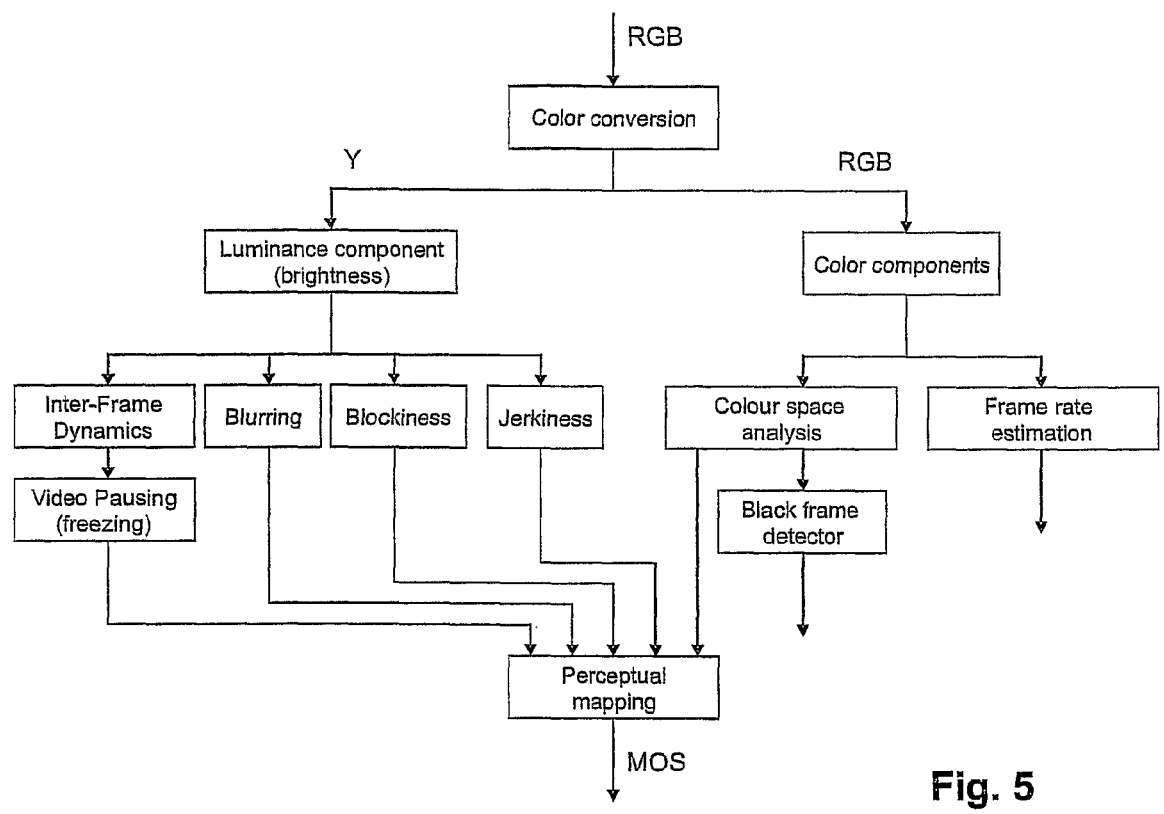
FIG. 5 is an algorithm for no-reference video quality assessment, FIG. 6 a block circuit diagram of the device, illustrating the phone's power supply, FIG. 7 a sectional view through the phone's housing with battery unit and part of the switch unit, and FIG. 8 the view of FIG. 7 with the battery unit mounted to the phone unit.

A specific example of an algorithm for a no-reference video quality assessment is shown in FIG. 5. It has the following processing steps:

The input video signal is color converted to obtain a luminance signal Y and an RGB signal.

The luminance Y and RGB signal are processed separately.

Using the luminance Y signal, blurring, blockiness, jerkiness and inter frame (picture) dynamics are derived.

The color signal allows to determine a parameter describing the colorfulness and to detect black frames.

Perceptual mapping combines the results from the above analysis to a single quality number (MOS=Mean Opinion Score), which is a main result of the algorithm.

In order to avoid anti-aliasing problems, the resolution of camera 12 is advantageously sufficiently high such that each pixel of the projected part of display 10 is projected onto at least two horizontal and two vertical pixels of camera 12. This oversampling prevents data loss between display 10 and the signal of camera 12.

Similarly, data loss in time space can be avoided if the frame rate of the camera is at least equal to the frame rate of the display.

Depending on the section of display 10 that is projected onto camera 12, some parts of the recorded image may have to be filtered out before processing. For example, if the projected part of display 10 contains status information superimposing a video image, the areas containing the status information may have to be ignored.

Apart from assessing the quality of image or video data recorded by camera 12 from display 10, control and processing circuitry 39 may also derive information indicative of an operational status of phone 8 from the signal from camera 12. For example, if phone 8 displays a typical error message on display 10 in case of malfunction, this error message can be detected by suitably processing the image recorded by camera 12. Similarly, a malfunctioning camera may exhibit typical display behavior, such as a complete freeze or blackout of the display, which again can be detected by suitably processing the signal from camera 12. Generally, the signal from the camera 12 can be processed to detect an operational status and in particular a malfunctioning of the phone. Depending on the detected operational status, suitable commands can then be issued to the phone or the phone can be reset.

In the embodiment above, control and processing circuitry 39 is capable to fully process the signal from camera 12 and to create the relevant parameter's describing the quality of the image or video data. However, part of that functionality can also be delegated to an external computer.

In the embodiment above, processing circuitry 39 has used the signal from camera 12 as one source of information for assessing the transmission quality. Alternatively, or in addition thereto, processing circuitry 39 can also use the phone's audio signal, or a digital raw data signal obtained through the phone's digital interface.

Phone Power Supply

Due to the lack of a reliable hardware reset input in most phones, it must be possible for the processing circuitry 39, to interrupt the power supply to the phone for resetting the same.

Normal mobile phones consist of a phone unit and a battery unit. The phone unit incorporates most the phone's circuitry, its keys and its display. The battery unit contains a rechargeable battery and can be mounted to the phone unit to form the phone. The phone unit has a phone contact assembly, comprising a number of contacts arranged at a predefined position and geometry in a battery bay of the phone unit. Similarly, the battery unit has a matching battery contact assembly, and the two contact assemblies are designed to contact each other for providing a power supply from the battery unit to the phone. In most phones, they also provide a means for charging the battery unit with current from an external power supplied plugged into the phone unit.

In conventional testing devices, the battery unit is removed from the phone unit, and a power supply is attached directly to the phone contact assembly. The power supply is designed to simulate the behavior and properties of the phone's original battery unit such that the phone is operating correctly.

Modern battery units tend, though, to become more and more complex. This makes it difficult to design a power supply that properly simulates a battery unit.

Figure 6:
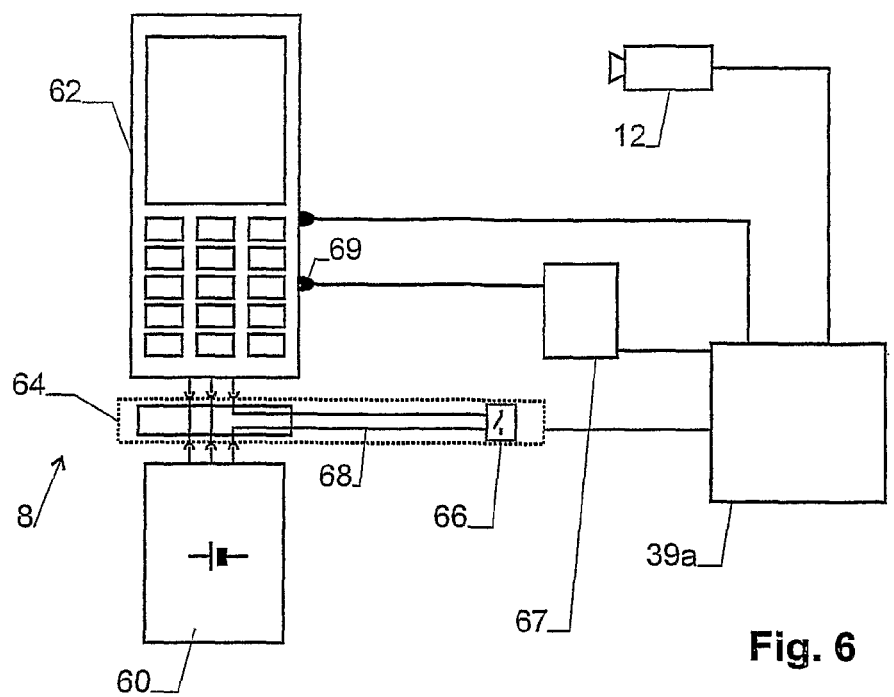

Hence, a design as shown in FIG. 6 is proposed. Here, the original battery unit 60 remains connected to the phone unit 62 of phone 8. In order to interrupt, if necessary, the power supply to phone unit 62, a switch unit 64 is arranged in the electrical path between battery unit 60 and phone unit 62. Switch unit 64 comprises a first switch contact assembly for being connected to the battery contact assembly, and a second switch contact assembly for being connected to the phone contact assembly. It further comprises at least one switch 66 for switching on and off a power supply from battery unit 60 to phone unit 62.

The operation of the device, and in particular of phone 8 and switch unit 64, is controlled by a control unit 39a, which is formed by the processing and control circuitry 39.

To feed phone unit 62 and to keep battery unit 60 charged, a power supply 67 is provided, which feeds power to a power supply plug 69, the latter being connected to a power supply input of phone unit 62.

To reset phone 8, switch 66 is deactivated to interrupt the current. At the same time, power supply 67 is switched off as well, which leaves phone 8 without current.

Figure 7:
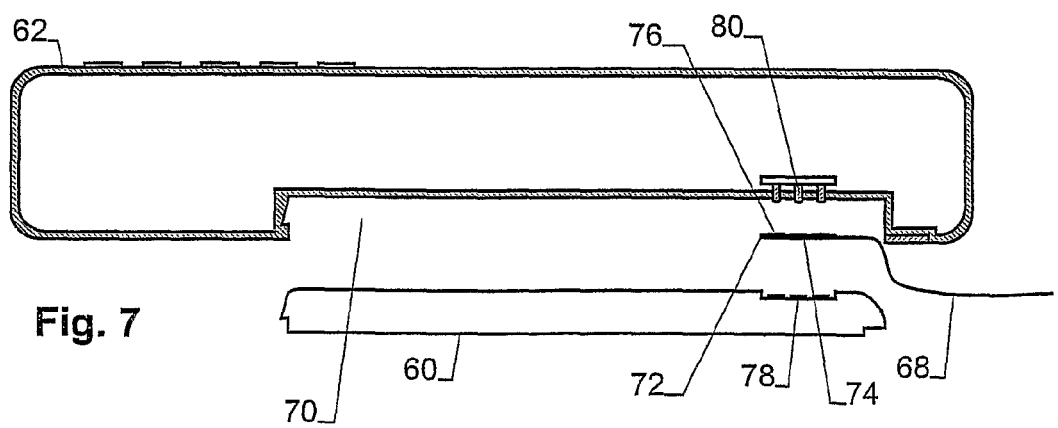
Figure 8:
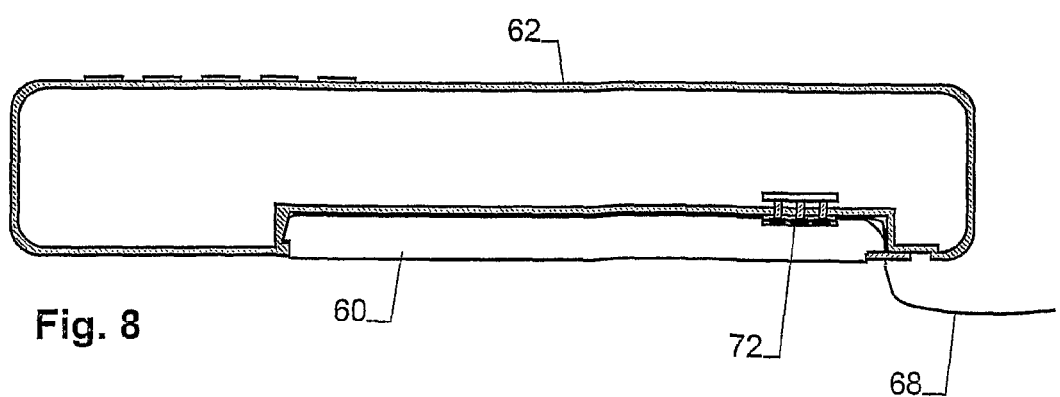

A specific example of this design is shown in FIGS. 7 and 8, where FIG. 7 shows, for illustration purposes, the phone with the battery unit 60 removed from its bay 70, while FIG. 8 shows the phone with the battery unit 60 inserted into its bay 70, as it will be operated in the device of FIGS. 1-3.

In the shown embodiment, switch unit 64 comprises a carrier 72, which e.g. a flexible, non-conducting foil. Carrier 72 carries the first switch contact assembly 74 on its first side and the second switch contact assembly 76 on its second side.

As can be seen from FIG. 7, the first switch contact assembly 74 is shaped to contact the contacts of the battery contact assembly 78, while the second switch contact assembly 76 is shaped to contact the contacts of the phone contact assembly 80.

A flexible wire or printed circuit foil forms a connector line 68 that connects the contacts on carrier 72 to switch or switches 66.

Advantageously, the thickness of carrier 72 is less than 1 mm, in particular less than 500 μm, such that it is easily possible to insert battery unit 60 into bay 70 with carrier 72 being physically arranged between battery contact assembly 78 and phone contact assembly 80.

In the example of FIG. 6, only the connecting line of one of three contact pairs of the contact assemblies is fed through one switch 66. Depending on the design of the contact assemblies of battery unit 60 and phone unit 62, the lines between more than one of the contact pairs of the contact assemblies can be fed through a corresponding number of switches 66.

Also, in the embodiment of FIG. 6, all contacts are fed through switch unit 64, even only one of them is fed through an actual switch. Alternatively, the contacts that do not have to be fed through a switch can be connected directly to each other, without having to go through switch unit 64 at all. In that case, it is e.g. possible to reduce the size of carrier 76, such that it extends only over the contacts that need to be routed through a switch. However, to ensure good contact between all pairs of contacts, a carrier 76 extending over all contacts of the contact assemblies is advantageous.

Further, in the embodiment of FIG. 8, the phone is operated while battery unit 60 resides in the battery bay of phone unit 62. It is, however, also possible to mount battery unit 60 at a distance from phone unit 62, in which case switch unit 64 comprises suitable wires or leads for carrying the currents between battery contact assembly 78 and phone contact assembly 80.

Finally, while FIGS. 7 and 8 imply that the contact assemblies of switching unit 64 merely touch the contact assemblies of battery unit 60 and phone unit 62, it is also possible to solder or clamp the switch contact assemblies to the battery and/or phone contact assembly.

While there are shown and described presently preferred embodiments of the invention, it is to be distinctly understood that the invention is not limited thereto but may be otherwise variously embodied and practiced within the scope of the following claims.

The invention claimed is:

1. A method for assessing the quality of a mobile phone and/or mobile phone network comprising the step of
    obtaining a phone unit and a battery unit, wherein said battery unit is suited to be mounted to and to power said phone unit to assemble a mobile phone and
    mounting said phone unit in a test device, which test device comprises a control unit for controlling operation of the phone unit,
    characterized by the steps of
    connecting said battery unit to said phone unit via a switch unit, which switch unit comprises at least one switch for connecting or disconnecting a power supply from said battery unit to said phone unit and
    controlling said switch unit from said control unit.

2. The method of claim 1, wherein said phone unit has a phone contact assembly and said battery unit has a battery contact assembly, wherein said phone contact assembly and said battery contact assembly are designed to contact each other for providing a power supply from said battery unit to said phone unit, and wherein said switch unit has a first switch contact assembly and a second switch contact assembly, wherein said first switch contact assembly is connected to said battery contact assembly and said second switch contact assembly is connected to said phone contact assembly.

3. The method of claim 2, wherein said switch unit comprises a carrier carrying said first switch contact assembly on a first side thereof and said second switch contact assembly on a second side thereof, wherein said carrier is physically located between said phone contact assembly and said battery contact assembly.

4. The method of claim 1, further comprising the step of feeding power to a power supply input of said phone unit for feeding said phone unit and charging said battery unit.

5. A device for assessing the quality of a mobile phone and/or mobile phone network comprising a control unit for controlling operation of a battery operated test phone, wherein said test phone comprises a phone unit and a battery unit wherein said device further comprises a switch unit for being arranged electrically between the battery unit and the phone unit, said switch unit comprising a first switch contact assembly suited for contacting a battery contact assembly of said battery unit and a second switch contact assembly suited for contacting a phone contact assembly of said phone unit.

6. The device of claim 5, wherein said switch unit comprises a carrier, wherein said first switch contact assembly is arranged on a first side of said carrier and said second switch contact assembly is arranged on a second side of said carrier.

7. The device of claim 6, wherein said switch unit further comprises at least one switch for switching on and off a power supply from said battery unit to said phone unit and a connector line extending from said carrier to said switch.

8. The device of claim 6, wherein said carrier has a thickness of less than 1 mm.

9. The device of claim 6, wherein said carrier is flexible.

10. The device of claim 5, further comprising a power supply feeding current to a power supply plug for being plugged into a power supply input of said phone unit.

* * * * *